Aug. 22, 1950  C. M. WILKINSON  2,519,989
CAMERA SUNSHADE
Filed Jan. 8, 1947  3 Sheets-Sheet 1

INVENTOR
Clarence M. Wilkinson
BY
Arthur H. Robert
ATTORNEY

Aug. 22, 1950          C. M. WILKINSON          2,519,989
                        CAMERA SUNSHADE
Filed Jan. 8, 1947                              3 Sheets-Sheet 2
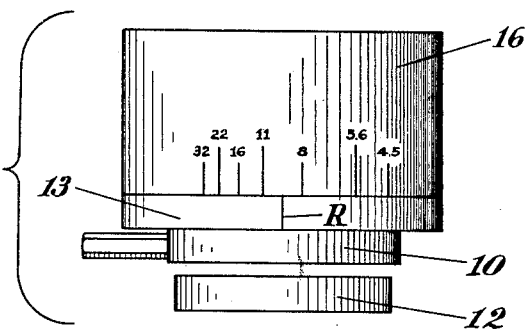
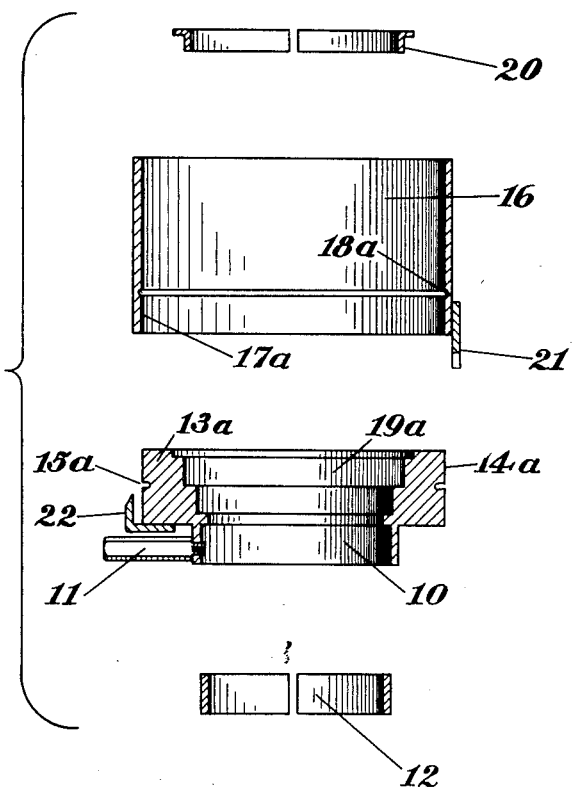
INVENTOR
Clarence M. Wilkinson
BY
Arthur J. Robert
ATTORNEY Aug. 22, 1950  C. M. WILKINSON  2,519,989
CAMERA SUNSHADE Filed Jan. 8, 1947  3 Sheets-Sheet 3

INVENTOR
Clarence M. Wilkinson
BY
Arthur F. Robert
ATTORNEY

Patented Aug. 22, 1950

2,519,989

UNITED STATES PATENT OFFICE 2,519,989

CAMERA SUNSHADE

Clarence M. Wilkinson, Louisville, Ky.

Application January 8, 1947, Serial No. 720,789

1 Claim. (Cl. 88—1)

This invention relates to sun shades for cameras having lever set stop openings and has, for its principal object, the provision of a novel sun shade which eliminates the difficulty usually encountered in adjusting the diaphragm opening of such a camera when a sun shade is mounted on the camera.

Another important object is to provide a sun shade assembly which may be easily and quickly attached to or detached from a camera, of the type having a lever controlled diaphragm, and which, when attached, provides a ready means of determining the setting of the diaphragm and of adjusting the diaphragm to any desired setting.

More specifically, it is an object of this invention to provide a cylindrical sun shade which has readily visible diaphragm graduations on its periphery and which is arranged for rotational mounting on a camera in operative relation to a lens mount and in connected relation to the diaphragm for primary use as a combination sun shade and diaphragm adjuster and, if desired, for additional use as a holder for filters and the like.

The invention is illustrated in the accompanying drawings wherein:

Fig. 4 is a top plan view of the assembly shown in Fig. 3 with one part (the adapter ring) rotated 90 degrees relatively to the sun shade;

Fig. 5 is an exploded view, in vertical section, of a modified form of sun shade assembly embodying my invention;

Figure 1:
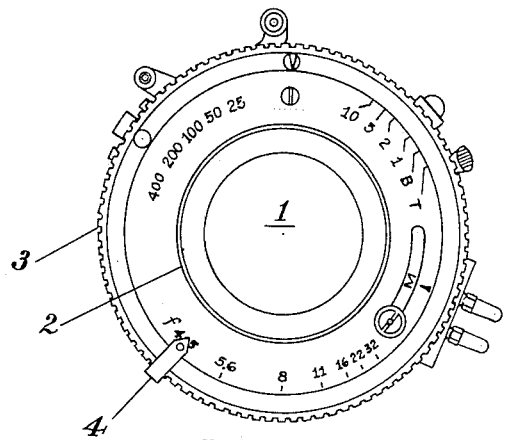
Fig. 1 is a front elevational view of the lens mount, and the immediately surrounding structure, of a conventional camera having a diaphragm lever.

The structure shown in Fig. 1 conventionally comprises: a lens 1; a lens mount 2; a head 3 from which the lens mount projects, the face of this head being provided with diaphragm stop indications or graduations adjacent its bottom; and a diaphragm operating lever 4. With an arrangement of this character, the difficulty of adjusting the diaphragm, when a sun shade is mounted on the camera, will be readily appreciated.

In accordance with my invention, this particular difficulty may be overcome through the provision of a novel sun shade assembly which, stated somewhat specifically, comprises: an adapter ring which may be readily slipped over the periphery of the lens mount, rotationally adjusted about the lens mount to a desired position and rigidly secured thereto in such position; a sun shade rotationally mounted on the adapter ring to project forwardly therefrom; and an operating arm mounted on and extending rearwardly from the sun shade with its rear end operatively engaging the diaphragm lever so as to move the lever and thereby adjust the diaphragm upon rotation of the sun shade.

Figure 2:
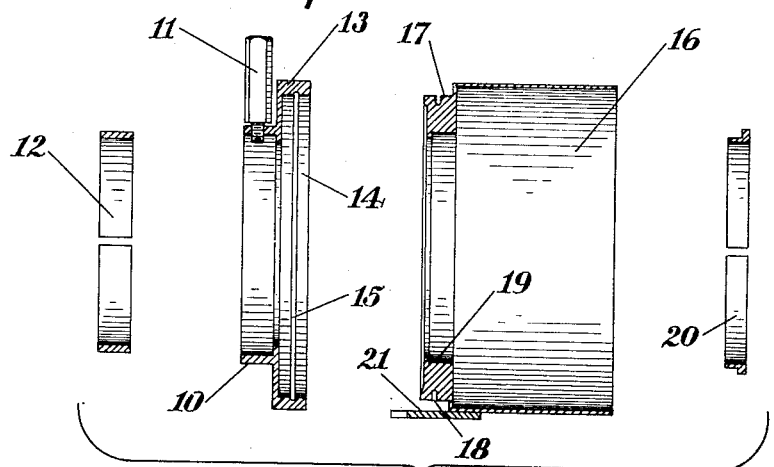
Fig. 2 is an exploded view, in vertical section, of a sun shade assembly embodying my invention.
Figure 3:
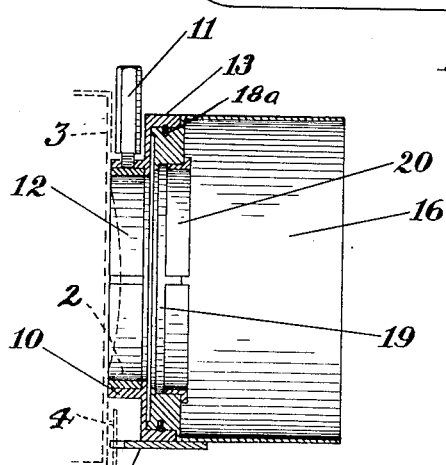
Fig. 3 is an assembled view, in vertical section, of the parts shown in Fig. 2 and illustrating such parts in relation to the lens mount and diaphragm lever of a conventional camera.

In the embodiment of Figs. 2–4, the adapter ring has an annular collar 10, which is intended to slip over the periphery of the lens mount 2, and a set screw 11 for securing it to the lens mount in some desired position. In order that the same adapter ring may be used with a range of lens mounts of different outside diameters, one or more split bands 12 may be provided for insertion between the collar 10 and mount 2 as desired. The front end of the collar 10 is integrally joined with a relatively larger annular member 13 providing a circular seat 14 on which the sun shade may be rotationally mounted. This seat contains an endless groove 15 for sun shade locking purposes.

The sun shade 16 is in the form of a cylinder having, at its rear end, a seat 17 and an endless groove 18. The sun shade is telescopically thrust into position upon the annular member 13 of the adapter ring with its seat 17 fitting snugly against the seat 14 of the ring and with its groove 18 in opposed mating relationship with the groove 15 of the ring. It may be removably locked upon the ring, against accidental axial displacement or removal, by the use of an appropriately dimensioned spring steel wire 18a in the mating grooves. The sun shade contains another seat 19 upon which a filter holder may be placed and in which it may be removably yet firmly secured by a split retaining ring 20.

The periphery of the sun shade carries a rearwardly extending operating arm 21 which is arranged at its rear end for operative engagement with a diaphragm operating lever 4. The peripheries of the sun shade and the adapter ring are provided with means for indicating the diaphragm settings, one part having a reference line R and the other the appropriate diaphragm graduations shown in Fig. 4.

To facilitate a clear understanding of the mounting and operation of the assembly, it may be assumed that the diaphragm lever is set at stop 8. With this setting, the sun shade will be rotated relatively to the adapter ring until the reference line R is set at 8. The sun shade assembly, as a whole, is then mounted on the lens mount 2 in a manner such as to place the operating arm 21 into operative engagement with the lever 4. When so mounted, the set screw 11 is tightened to secure the adapter ring rigidly to the lens mount. With the parts thus secured, any desired diaphragm setting may be obtained simply by rotating the sun shade to place the desired graduation at the reference line 4.

It should be noted that the adapter ring facilitates the use of the sun shade with any of a range of different cameras having diaphragm levers located at different areas around the lens mount. While an adaptable construction of this character is preferred, it will be appreciated that where the sun shade is designed for use with one specific camera or specific line of cameras, it may be rotationally mounted directly on the head 3 or on the shutter mount (not shown) or on the lens mount 2 without requiring the use of a special adapter ring. In such cases the head 3 or shutter mount or the lens mount 2 would be modified to provide a support for the rotational sun shade, but, since the manner of accomplishing such modification is more or less obvious, it is not illustrated. In the event the adapter ring is thus eliminated, the camera and the external periphery of the sun shade will be provided with readily visible appropriately located means for indicating the diaphragm setting.

While the prime object of this invention is to eliminate the diaphragm adjustment difficulty previously noted, the embodiment of Figs. 2–4 is capable of being used at one time as a combination sun shade and diaphragm adjuster and at another time as a combination sun shade and polarizing filter adjuster. In this latter use, a polarizing filter is mounted on the filter holder seat 19 while the operating arm 21 is disconnected from the diaphragm lever 4. Thus the polarizing filter may be rotationally adjusted to a desired angle by appropriately rotating the sun shade.

The embodiment of Fig. 5, is similar to that of Figs. 2–4, in that it includes: an adapter ring collar 10; a set screw 11; one or more split bands 12 if desired; a cylindrical sun shade 16; a split retaining ring 20; and an operating arm 21. In the Fig. 5 embodiment, however, the collar 10 is integrally connected with a relatively larger annular member 13a having a seat 14a on its external periphery, a groove 15a in the seat, and a filter holder seat 19a, while the inner periphery of the cylindrical sun shade 16, adjacent its rear end, forms a seat 17a containing an endless groove 18a. An indicator arm 22 is provided in place of a reference line R.

The mounting of the sun shade of the Fig. 5 embodiment and its operation, when mounted, are substantially the same as that of the Figs. 2–4 embodiment. The only appreciable difference is that in Fig. 2 the sun shade 16 fits within the interior of seat 14 whereas in Fig. 5 it fits over the exterior of seat 14a. One advantage of the modification illustrated in Fig. 5 is that it reduces the cost of the sun shade without equally increasing the cost of the adapter ring. In this case the adapter ring must be rotated where polarizing filter adjustment is desired.

All embodiments herein shown are for cameras of the type having a lens mount and a lever controlled diaphragm. The embodiments in Figs. 2–4 and in Fig. 5 may be said to comprise: a sun shade assembly which may consist of the sun shade alone or comprise the sun shade in combination with one or more other parts such as the adapter ring; and means for rotationally mounting the assembly on the camera with the sun shade in operative relation to the lens mount and in connected relation to the diaphragm lever so as to move the lever and thereby adjust the diaphragm upon rotation of the sun shade. While I prefer an arrangement wherein the diaphragm lever may be adjusted by rotating the sun shade, it may be desirable, in some cases, to adjust the diaphragm through an operating arm which is mounted on the sun shade assembly for rotation independently of the sun shade. An embodiment of this latter character is shown in Figs. 6–7 and, as shown, comprises: a sun shade assembly; an operating arm rotationally mounted on the assembly; and means for mounting the assembly on the camera with the sun shade in operative relation to the lens mount and with the rotational operating arm in connected relation to the diaphragm lever.

Figure 6:
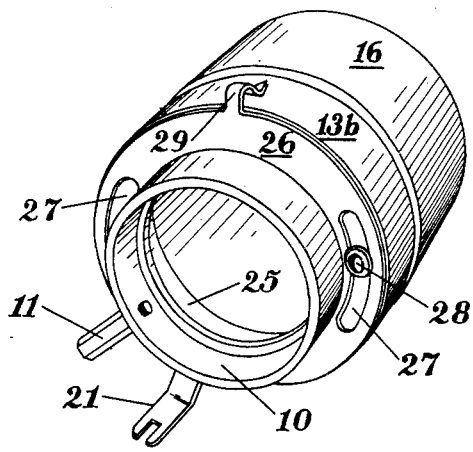
Fig. 6 is an assembled view, in vertical section, of another modified form of sun shade assembly embodying my invention.
Figure 7:
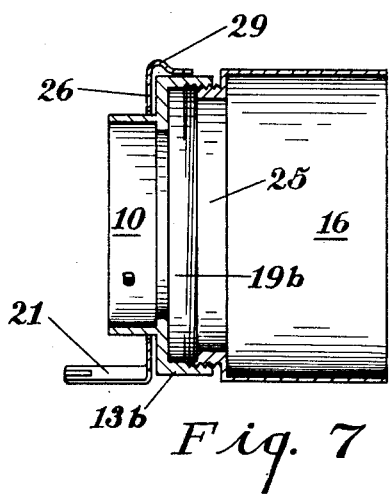
Fig. 7 is a perspective view of the modification shown in Fig. 6.

The embodiment of Figs. 6–7, is similar to the embodiments of Figs. 2–4 and of Fig. 5 in that it includes: an adapter ring collar 10; a set screw 11; an annular member 13b; a cylindrical sun shade 16; a filter holder seat 19b on the adapter ring; and an operating arm 21. The adapter ring and the sun shade together form an assembly which is stationarily secured to the camera while the operating arm is rotationally mounted on the assembly for diaphragm setting purposes. The annular member 13b on the adapter ring is internally threaded to receive an externally threaded reduced collar 25 on the sun shade. The seat 19b on annular member 13b may be used to receive a filter which can be securely held in place simply by screwing the sun shade 16 inwardly until the end of collar 25 presses the filter against the inner radial wall of the annular member 13b. To adjust the diaphragm, a disc like ring 26 is rotationally mounted on the adapter ring through the agency of slots 27 in the disc and screws 28 on the adapter ring. This ring 26 carries the operating arm 21 and an indicator arm 29, the latter being associated with diaphragm graduations (not shown) on the peripheral surface of the adapter ring.

With the Figs. 6–7 arrangement, the ring 26 may be rotationally adjusted to the diaphragm lever setting of a camera and then the whole unit mounted on the camera in a position such as to place the operating arm 21 in engagement with the diaphragm lever of the camera.

Having described my invention, I claim:

A sun shade attachment for use with a camera of the type having a lens mount projecting forwardly from its front face and a diaphragm adjusting lever mounted for partial revolution around the periphery of the lens mount and along a series of diaphragm setting indices which are located on the front face of the camera a slight distance outwardly from the periphery of the lens mount, comprising: an adapter ring arranged to be slipped over the periphery of the lens mount to occupy a desired angular position relatively thereto, said ring having a collar dimensioned to fit around the periphery of the lens mount and a relatively larger annular member which provides a sun shade seat and which obscures the front face setting indices when the ring is mounted on the lens mount: means for detachably securing the adapter ring rigidly to the lens mount in said position; a sun shade rotationally mounted on said sun shade seat to project forwardly from the ring; an operating arm mounted on and extending rearwardly from the sun shade with its rear end operatively engaging the diaphragm lever so as to move the lever and thereby adjust the diaphragm upon rotation of the sun shade; and means on adjacent peripheral portions of the sun shade and adapter ring for indicating the diaphragm settings.

CLARENCE M. WILKINSON.

REFERENCES CITED

The following references are of record in the file of this patent:

UNITED STATES PATENTS

| Number | Name | Date |
| --- | --- | --- |
| 738,503 | Waters | Sept. 8, 1903 |
| 1,262,347 | Ide | Apr. 9, 1918 |
| 1,564,987 | Turner | Dec. 8, 1925 |
| 1,818,024 | Wittel | Aug. 11, 1931 |
| 1,829,319 | Wheeler | Oct. 27, 1931 |
| 2,125,908 | Frotschner | Aug. 9, 1938 |
| 2,241,596 | Guhl | May 13, 1941 |
| 2,260,712 | Harrison | Oct. 28, 1941 |
| 2,268,341 | Nerwin | Dec. 30, 1941 |